(12) United States Patent
Carro et al.

(10) Patent No.: US 6,934,845 B2
(45) Date of Patent: Aug. 23, 2005

(54) METHOD AND SYSTEM OF REVERSIBLY MARKING A TEXT DOCUMENT WITH A PATTERN OF EXTRA BLANKS FOR AUTHENTICATION

(75) Inventors: Fernando Incertis Carro, Valencia (ES); Stephen M. Matyas, J., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 09/805,745

(22) Filed: Mar. 13, 2001

(65) Prior Publication Data

US 2001/0054146 A1 Dec. 20, 2001

(30) Foreign Application Priority Data

Mar. 20, 2000 (EP) .......................................... 00480030

(51) Int. Cl.$^7$ ................................................ H04L 9/00
(52) U.S. Cl. ...................................... 713/171; 713/181
(58) Field of Search ............................... 713/160–161, 713/164–167, 168–171, 176, 181

(56) References Cited

U.S. PATENT DOCUMENTS 6,606,385 B1 * 8/2003 Aikawa et al. ............... 380/28

OTHER PUBLICATIONS

Bender et al. Techniques for Data Hiding. 1996. IBM Systems Journal.vol. 35, pp. 313–335.*

* cited by examiner

Primary Examiner—Kim Vu
Assistant Examiner—Ponnoreay Pich
(74) Attorney, Agent, or Firm—Thomas A. Beck; Louis P. Herzberg

(57) ABSTRACT

A method of marking an original text document in which existing inter-word blank characters are altered is disclosed. A reversible transform is first applied so that inter-word intervals become exclusively comprised of odd numbers of blank characters. Transformed original text is then split in two subsets and an authentication pattern is merged into first subset by adding inter-word blank characters. A blurring pattern is computed which further modify the number of blank characters so as to hide the authentication pattern. Second subset is blurred too before subsets are recombined to obtain a marked text susceptible of authentication.

A method of authenticating a text document marked according to the here above method is also disclosed.

The system and the methods of the invention permit that a text document be authenticable while authentication pattern is imbedded, and deeply hidden, into the text document itself. Also, the exact original format, including the numbers of inter-word blanks, can be restored by the recipient.

8 Claims, 6 Drawing Sheets

METHOD AND SYSTEM OF REVERSIBLY MARKING A TEXT DOCUMENT WITH A PATTERN OF EXTRA BLANKS FOR AUTHENTICATION

FIELD OF THE INVENTION

The present invention relates to the field of document authentication. It is more specifically concerned with the authentication of soft-copy text documents.

BACKGROUND OF THE INVENTION

In the current environment of computer networks characterized by an exponential growth in the circulation of soft-copy or electronic text documents such as e-mail over unsecured media e.g., the Internet, a key issue is authentication. It should be possible for the recipient of a text document to make sure of its origin so that no one should be able to masquerade as someone else. Also, it should be possible to verify it has not been modified, accidentally on maliciously, en route. To this end methods have been devised to perform authentication.

The standard solution, which fits well with electronic text documents, consists in adding a MAC or Message Authentication Code to soft-copy text documents. A MAC is a digest computed with a one-way hash function over the text and which is also made dependent on a key e.g., a secret-key known only to the sender and the receiver in order this latter can check first, that what it received has well been originated by whom shares the secret-key with it and second, that the document has not been altered. For example, Secure Hash Algorithm or SHAD specified by the National Institute of Standards and Technologies, NIST, FIPS PUB 180-1, "Secure Hash Standard", US Dpt of Commerce, May 1993, produces a 160-bit hash. It may be combined with a key e.g., through the use of a mechanism referred to as HMAC or Keyed-Hashing for Message Authentication, subject of the RFC (Request For Comment) of the IETF (Internet Engineering Task Force) under the number 2104. HMAC is devised so that it can be used with any iterative cryptographic hash function thus, including SHAD. Therefore, a MAC can be appended to the soft-copy of a text document so as the whole can be checked by the recipient. Thus, this method assumes the addition of checking information to a file which has the inconvenience of indeed separating text and checking information. Hence, this latter can easily be isolated and removed intentionally, in an attempt to cheat, or accidentally just because intermediate pieces of equipment in charge of forwarding the electronic documents are not devised to manipulate this extra piece of information. Then, the checking information should rather be encoded transparently into the body of the text document itself i.e., in a manner that does not affect text readability whatsoever, so that it remains intact across the various manipulations it is exposed to on its way to destination still enabling the end-recipient to authenticate the document.

Another type of approach to authentication, which applies mainly to soft-copy images (which thus may also be used on the image of a text document), consists in hiding data into their digital representation therefore, meeting the above requirement that checking information should better be merged into the document itself. Data hiding in images has received a considerable attention mainly because of the copyrights attached to digital multimedia materials which can easily be copied and distributed everywhere through the Internet and networks in general. A good review of data hiding techniques is in 'Techniques for data hiding' by W. Bender and al. published in the IBM Systems Journal, Vol. 35 Nos 3&4, 1996. As an illustration to the way data hiding may be carried out the most common form of high bit-rate encoding, reported in here above paper, is the replacement of the least significant luminance bit of image data with the embedded data. This technique which indeed meets the requirement of being imperceivable (the restored image is far to be altered to a point where this would become noticeable) may serve various purposes, similar to authentication including watermarking, aimed at placing an indelible mark on an image or tamper-proofing, to detect image alterations especially, through the embedding of a MAC into the soft-copy image.

However, having to consider a text as an image would be a very costly and inadequate solution in term of storage and bandwidth necessary to transmit it. Although, as stated in here above paper, soft-copy text is in many ways the most difficult place to hide data due to the lack of redundant information in a text file as compared to a picture the manipulation of white spaces i.e., blank characters and more specifically inter-word blank characters purposely inserted by the originator of a text document, in excess of what is strickly necessary to make a text readable (i.e., one blank between any two words), is the most simple way of marking a text that is susceptible to be authenticated without the addition of a separated MAC since the information necessary for the checking is then imbedded, somehow hidden, into the text itself, under the form of extra inter-word blanks, that the casual reader is unlikely to take notice of. Moreover, ideally (even though text is readable), the end recipient of the document should also be able to reformat the original text document exactly as it was created. Also, the addition of extra blanks should be conducted in such a way that code breakers see their job much complicated by not being able to determine in advance which ones of the extra inserted blanks, present in the coded text, are really holding the authentication data.

Therefore it is a broad object of the invention to provide a method to merge the information necessary to authenticate a text document, into the body of the document itself, under the form of extra inter-word blanks.

It is another object of the invention to permit that the recipient of the document be able to restore exactly the format, including the number of blanks, of the original text.

It is still another object of the invention to merge the extra blanks, actually carrying the authentication data, with dummy blanks so as to even confuse more an attacker.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method of marking an original text document which consists in altering the numbers of existing inter-word blank characters of the text is disclosed. First, a reversible transform is applied over the original text document in order that all inter-word intervals become exclusively comprised of odd numbers of blank characters. Then, transformed original text is split into a first and a second subset of words including their trailing inter-word intervals. An authentication pattern, fitting the number of inter-word intervals in the first subset, is then computed using the original text document and a secret-key as inputs. Hence, inter-word blank characters are added in positions corresponding to the authentication pattern. After which, from the canonical form (i.e., a form of text in which all inter-word blank characters in excess of one are stripped off) of the first subset and the secret-key, a blurring pattern is computed which fits the number of inter-word intervals too so that the numbers of inter-word blank characters are further modified thus, blurring the authentication pattern just added in first subset. Although it does not contain the authentication pattern the second subset is blurred too, in a similar way before recombining the first and the second subset thus, obtaining a marked text susceptible of authentication.

A method of authenticating a text document marked according to the here above method is also disclosed. First step consists in splitting the marked text document to retrieve the first and the second subset of words and intervals. Then, the effect of the blurring pattern is removed in both subsets. This also permits to extract the authentication pattern, that was imbedded in first subset, after which subsets are recombined. At this stage all inter-word intervals are comprised of odd numbers again and the transform used by the first method is reversed so that the exact format of the original text is recovered. Finally, as in first method, an authentication pattern is further computed which is compared with the authentication pattern extracted here above. If matching, marked text is known to be authentic.

A system carrying out the methods of the invention is also disclosed. Methods and system per the invention permit that a text document be authentic able while authentication pattern is imbedded, and deeply hidden, into the text document itself and exact original format, including the numbers of inter-word blanks, restored by the recipient.

DETAILED DESCRIPTION OF THE PREFERRED EMBODIMENT

Figure 1:
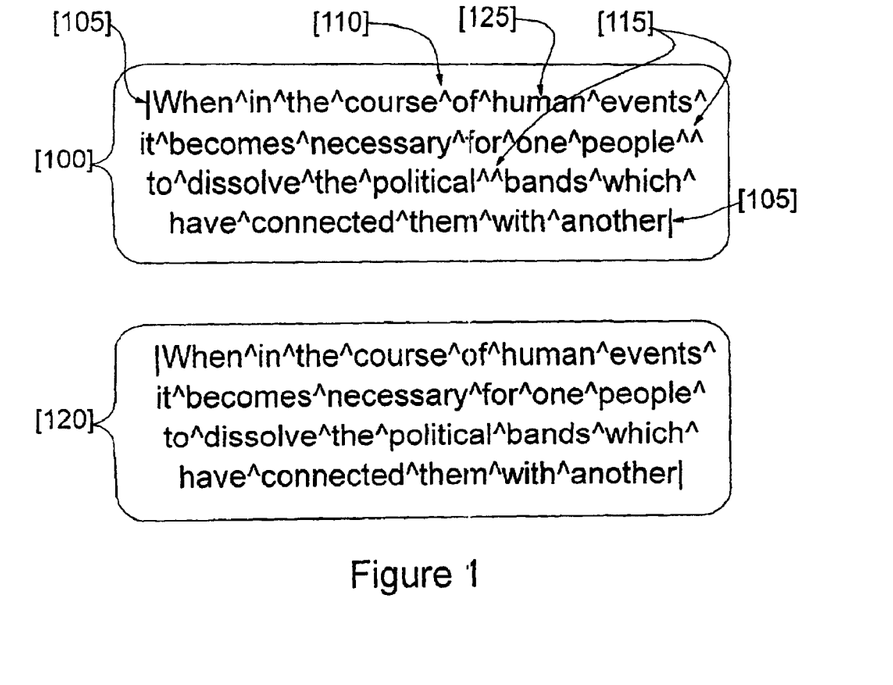
FIG. 1 shows the conventions adopted to describe the invention.

FIG. 1 depicts what conventions are used in the rest of the description and what is the canonical form [120] of a text per the invention. To describe the invention, a text [100] is shown to be starting and ending with a delimiter i.e., a vertical bar [105]. This delimiter is not part of the text itself and is just here to bind it unambiguously. Similarly, words are separated by blanks which are shown with a caret sign [110]. Thus, a text is made of words e.g., [125] and inter-word intervals comprising at least one blank [110] although more blanks may be found [115] which does not affect readability though. Canonical form of a text [120] is just the original form of the text [100], from which all inter-word blanks in excess of one [115] have been removed.

Figure 2:
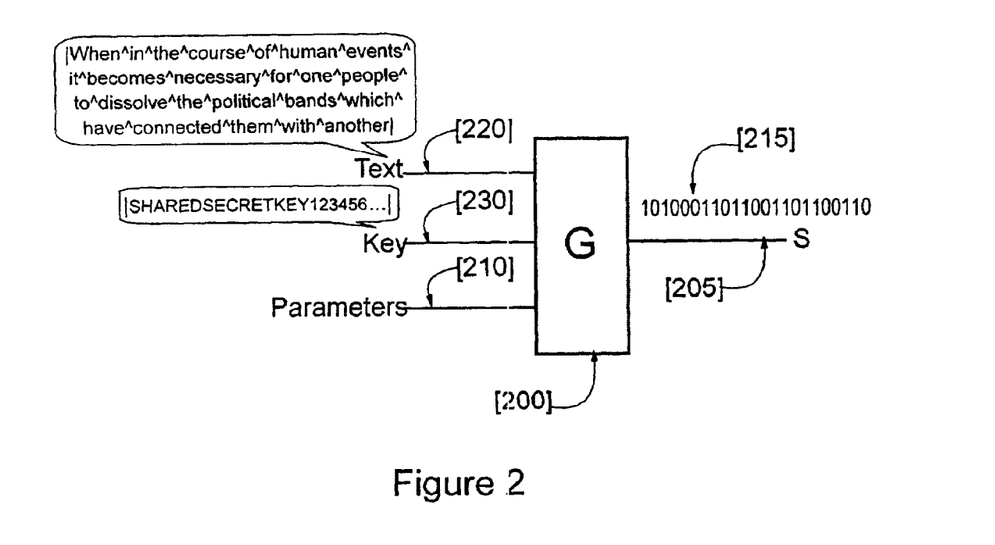
FIG. 2 depicts G function used to carry out the invention.

FIG. 2 shows a function G [200], needed to carry out the invention, which can be implemented in many ways from techniques and methods well known by those skilled in the art. Irrespective of the way function G is actually implemented it is assumed to be able to generate an output S [205] which is made dependent upon three types of entries. First, S is made dependent upon an input text [220], like the ones shown in FIG. 1. Second, output S must also depend on a key [230], shared by the parties involved in the authentication process. Third, of a set of parameters [210], aimed at conditioning the way function G must process input text and key especially, specifying what type and format of output S are expected in a particular instance of the function. As an example of the way function G is used by the invention, canonical form of the text already shown in FIG. 1, assumed to be ASCII coded, is the input text. Key is e.g., an alphanumeric text string [230] that must be kept secret. Then, parameter [210] may be set to instruct function G to produce for instance, a string of 23 binary bits [215]. Those skilled in the art will recognize that function G, such as described here above, could be implemented, for example, from a one-way hash function aimed at producing a unique digest of the input text and secret key, also made dependent of input parameters, such as the number of expected bits so that output S can be tailored to fit in any particular step of the invention described in the following figures. One-way hash functions, which carry many other names like compression function, message digest, have received a considerable attention and are central to modern cryptography. A good review of this subject can be found in 'Applied Cryptography' a book authored by Bruce Schneier and published by John Wiley & Sons, 2nd edition, 1996. What is specific in the hash function needed to carry out the invention, with respect to the general description that exists in the here above book and in the abundant literature on the subject, is that it must accept input parameters on top of the standard input text and key especially, to allow the size of the output to be tailored to fit a particular instance of the function. Although this is different of standard hash functions, which generally produce a fixed-size digest of a keyed-text, this does not raise any outstanding problem to those skilled in the art to devise such a function either, as suggested above, from a standard hash function or through any alternate method that would better fit in a particular implementation of the invention.

Figure 3:
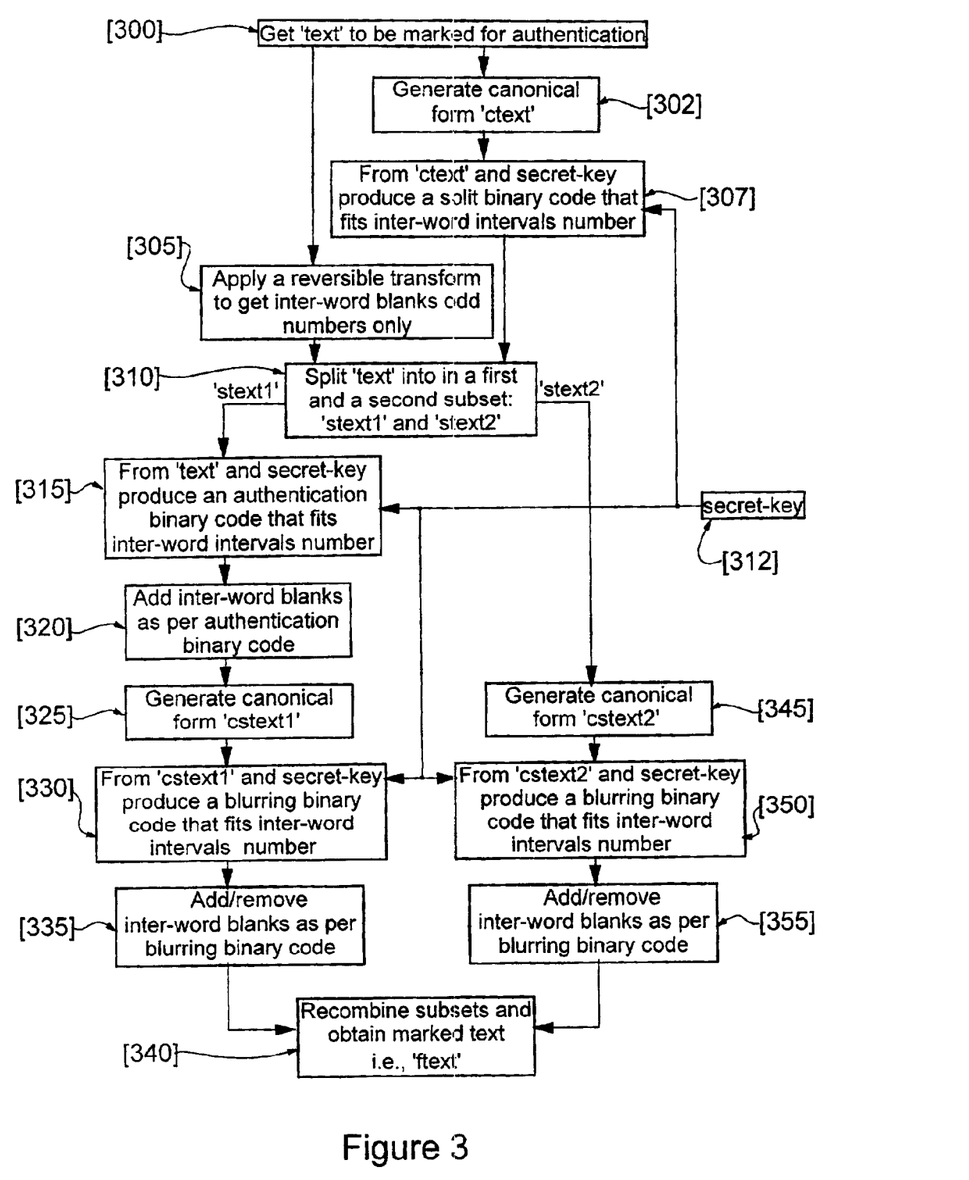
FIG. 3 describes the overall process to mark a text document.

FIG. 3 shows the main steps of the method per the invention. Method starts with a text [300] to be marked for authentication. First, one applies a reversible transform [305] in order that all inter-word intervals become comprised of an odd number of blanks. One way of achieving this is to add, to the number N of existing blanks, N−1 extra blanks so that if there is one inter-word blank between two words (the general case) it is unchanged after the transformation. If however, there are two blanks ther, one adds two minus one i.e., one extra blank to the two Existing ones thus, obtaining an odd three-blank interval. And so on. Therefore, at completion of step [305] 'text' is transformed so as it is only comprised of odd numbers of inter-word blanks. Then, transformed text is split [310] into two subsets 'stext1' and 'stext2' of randomly selected words, with their associated trailing blanks. This step, which .s further described in FIG. 5 hereafter, is carried out using the canonical form of text [300] generated at step [302] and a secret-key [312] as inputs, over the transformed text obtained at step [305]. Next step [315] consists in producing an authentication binary code i.e., a binary vector, length of which matches the number of inter-word intervals of 'stext1'. This is achieved in using function G described in FIG. 2. Code is used to insert more inter-word blanks e.g., to the position matching the ones (one may decide to use the zeros as well) of the binary vector so as the number of inter-word blanks that were all odd are now either odd and even. At this point text would be authentic able by the recipient however, to make much more difficult to an attacker the task of breaking the code, the number of inter-word blanks are further altered so as to blur the pattern of inter-word blanks. To this end, starting from the canonical form of the 'stext1' namely 'cstext1', obtained at step [325], and the secret-key another binary vector, aimed at blurring the here above authentication pattern of blanks, is generated at step [330], in a manner similar to step [315]. Then, blurring binary vector is used at step [335] in such a way that for each inter-word position of 'stext1' corresponding e.g., to a one, if the number of blanks is odd (1, 3 , . . . ) then one adds one extra blank however, if number is even (2, 4, . . . ) one removes one blank instead. This prevents the authentication code from being directly readable.

As far as blurring steps are concerned the same process is applied to the second subset 'text2'. Steps [345], [350] and [355] are thus identical to the equivalents steps just described for 'stext1'.

When done, marked and blurred 'stext1' and blurred 'stext2', are recombined [340] in a manner reverse to what was done at step [310] where transformed text, obtained at step [305], was split therefore, obtaining a marked text 'ftext' that can be authenticated. This last step obviously assumes that the manner split was done at step [310] be remembered so that the words (and trailing blanks) be recombined in the right order.

Figure 4:
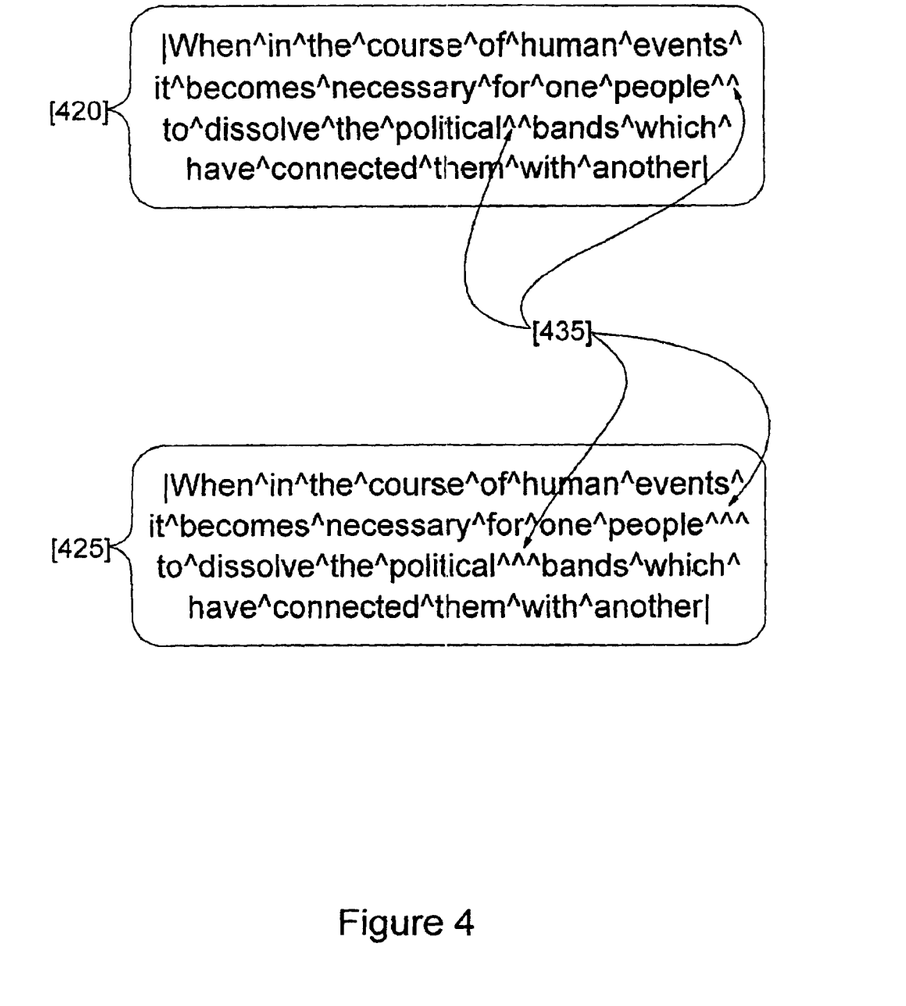
FIG. 4 focuses on the transform utilized to obtain odd inter-word intervals.

FIG. 4 illustrates in more details step [305] of FIG. 3 where the number of text inter-word blanks is transformed so as to get only odd numbers of blanks between any two words. In this example the function utilized to transform text [420] into text [425] adds N−1 extra blanks to the N existing blanks which results, with this particular text [420], to changing from two to three the number of blanks in only two positions [435].

Figure 5:
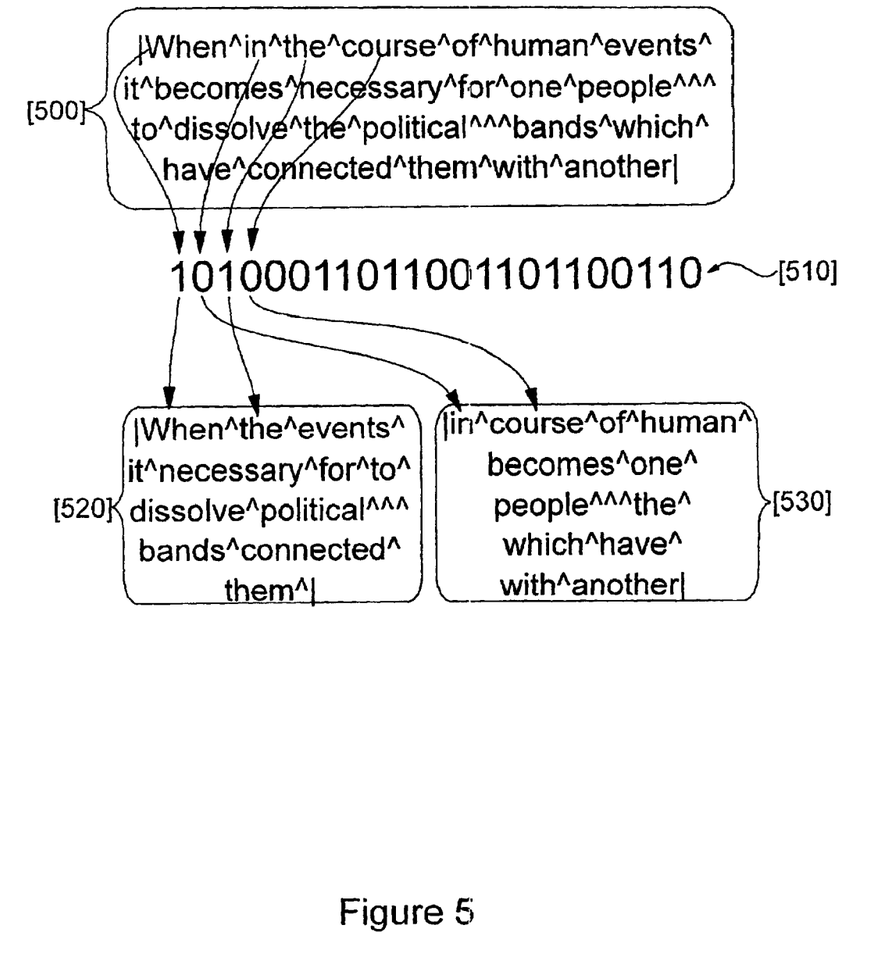
FIG. 5 shows how text document can be split into a first and a second subset.

FIG. 5 focuses mainly on step [310] also referring to steps [302] and [307] of FIG. 3 from where text [500] is split. Although many alternate equivalent ways are possible for these steps function G, described in FIG. 2, is used too in a preferred embodiment of the invention. That is, using the canonical form of text and the shared secret-key as inputs, function G is set to generate a split binary vector [510] fitting the number of inter-word text intervals.

It is worth noting here that whichever method is actually used to split a text it must provide, for a given combination of 'ctext' and secret-key, a unique manner of splitting the text so that the recipient of an authenticated text marked according to the method of the invention will be able upon reception to obtain the same split. In practice, this requires that, in the preferred embodiment of the invention which uses function G previously described, that input parameters to be used be agreed upon in advance (or the method of unambiguously determining them) between the sender and the receiver.

Then, using the split binary vector [510], words and associated trailing blanks, corresponding to the asserted bit of the vector are said to belong to a subset e.g., 'stext1' [520] while those corresponding to non asserted bits are said to belong to the other subset 'stext2' [530]. As already mentioned above, split binary vector [510] must be remembered to allow proper recombination of subsets as described at step [340] of FIG. 3.

Figure 6:
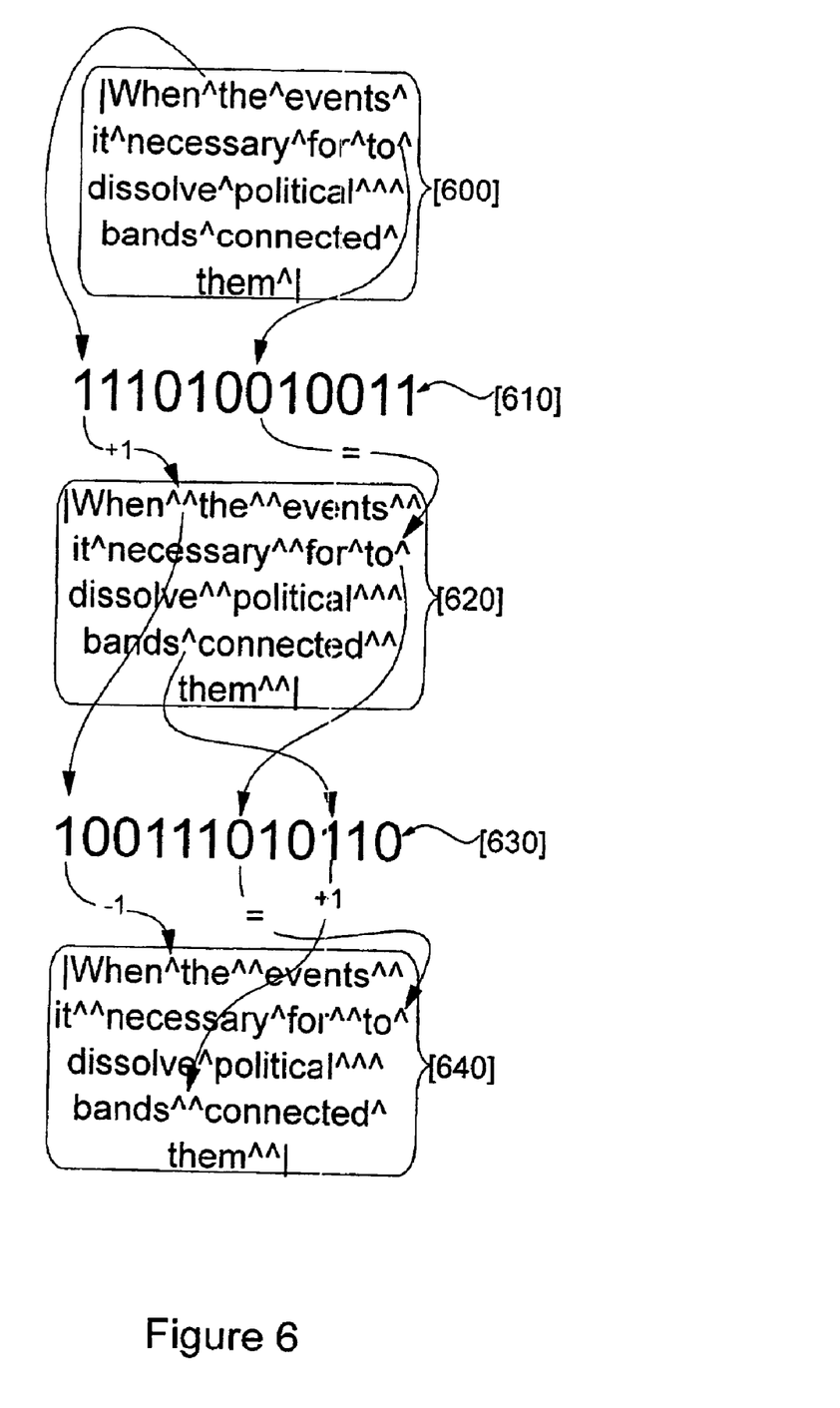
FIG. 6 depicts the process of imbedding the authentication and blurring patterns into first subset.

FIG. 6 illustrates how inter-word blanks are modified at steps [320] and [335] of FIG. 3 which respectively merge the authentication vector [610] computed at step [315] and the blurring vector [630] computed at step [330]. Subset of text ('stext1') having only odd inter-word blank numbers [600], and obtained as explained in FIG. 5, is further modified. Extra blanks are inserted corresponding to the asserted bits of the authentication vector [610] thus, producing text [620]. This latter text is in turn modified with the blurring vector [630] which adds, in the positions corresponding to the asserted bit of the vector, one extra blank if the number of blanks is odd, and removes one blank if the number of blanks is even. The result of this transformation is text [640].

Figure 7:
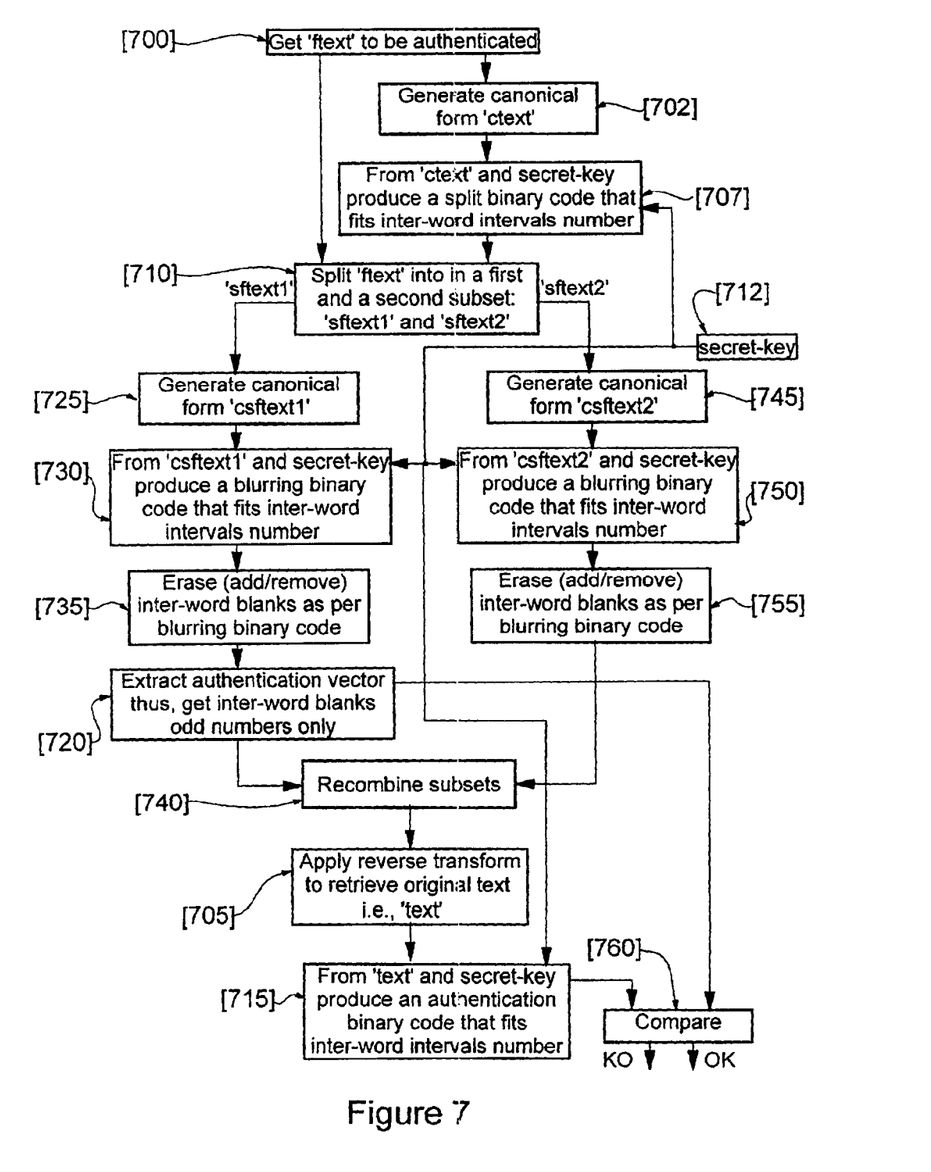
FIG. 7 describes the overall process to authenticate a marked text document.

FIG. 7 depicts the authentication process to be applied on a text which is assumed to have been marked according to the overall method described in FIG. 3. It is roughly the reverse of what is shown in this latter figure and allows to recover the text exactly as it was formatted by sender. Hence, process starts when 'ftext' to be authenticated is received [700]. Canonical form of this text is produced at step [702] thus, obtaining 'ctext' which when used with the shared secret-key [712] at step [707] allow to split 'ftext' into a first subset 'sftext1' and a second subset 'sftext2' of words with their trailing blanks at step [710]. Although trailing blank numbers would be generally different the result of the split operation must be obviously identical, as far as words split is concerned, to what was obtained at corresponding step [310] in FIG. 3 provided secret-key is indeed the same. Then, next step [725] consists in generating a canonical form of 'sftext1' i.e., 'csftext1' which when used with secret-key with function G [730] allows to generate a blurring vector which is used at next step [735] to erase (to reverse) what was done at step [335] of FIG. 3 to hide the authentication code. At this point, authentication vector, computed by the originator of the text, can be extracted at step [720] in reversing all the inter-word blank numbers to their closest odd number value. That is, removing a blank if even, none if odd therefore, getting an extracted authentication vector, asserted bits of which correspond to where blank characters had to be removed.

Similarly to steps [725], [730] and [735] steps [745], [750] and [755] are done on 'sftext2' to erase the effect of the blurring vector on the other subset too.

Then, the two subsets are recombined [740] to get back the text, comprised of odd intervals only. This is followed [705] by the application of the reverse transform used at step [305] allowing to retrieve the original text i.e., 'text' exactly as it was formatted by the originator. Therefore, the last steps consists in authenticating 'text' by computing from it and the secret-key an authentication binary vector [715] which, when compared [760] to the one resulting of step [720] must match to authenticate 'text'. If not, text is rejected as being not authentic.

What is claimed is:

1. A computer implemented method of marking an original text document said original text document comprising words separated by inter-word intervals, said inter-word intervals including one or more blank characters having numbers, said numbers being altered, said method of altering said numbers of said blank characters, comprising the sequence of steps of:

applying a reversible transform over said original text document in order that all said inter-word intervals become exclusively comprised of odd numbers of said blank characters;

splitting and transforming said original text document into a first subset and a second subset of said words including trailing blanks of said inter-word intervals of said words;

and over said first subset:

computing from said original text document and a secret-key, an authentication pattern that fits the number of said intervals of said first subset;

adding inter-word blank characters in positions corresponding to said authentication pattern;

generating a canonical form of said first subset;

computing, from said canonical form of said first subset and said secret-key, a blurring pattern that fits the number of said intervals of said first subset;

modifying the numbers of inter-word blank characters according to said blurring pattern;

and over said second subset:

generating canonical form of said second subset;

computing, from said canonical form of said second subset and said secret-key, a blurring pattern that fits the number of said intervals of said second subset;

modifying the numbers of inter-word blank characters according to said blurring pattern;

recombining said first subset and said second subset thereby, obtaining a marked text for authentication.

2. A computer implemented method of authenticating a marked text document, said marked text document comprising words separated by inter-word intervals, said inter-word intervals including one or more blank characters having numbers which are checked, said method comprising checking the numbers of said blank characters utilizing the steps in sequence of:

splitting said marked text document into a first subset and a second subset of said words including trailing blanks of said inter-word intervals of said words;

and over said first subset:

generating a canonical form of said first subset;

computing from said canonical form of said first subset and a secret-key a blurring pattern that fits the number of said intervals of said fast subset;

erasing modifications brought to the numbers of said inter-word blank characters per said blurring pattern;

extracting an authentication pattern thereby, obtaining in all said inter-word intervals, odd numbers of blank characters;

and over said second subset:

generating canonical form of said second subset;

computing from said canonical form of said second subset and said secret-key a blurring pattern that fits the number of said intervals of said second subset;

erasing modifications brought to the numbers of said inter-word blank characters per said blurring pattern thereby, obtaining in all said inter-word intervals, odd numbers of blank characters;

recombining said first subset and said second subset;

applying a reverse transform thus retrieving said original text document;

computing from retrieved, said original text document and said secret-key an authentication pattern that fits the number of said intervals of retrieved said original text document;

comparing extracted said authentication pattern and computed said authentication pattern;

if matching exactly, accepting said marked text document as authentic;

if not:

rejecting said marked text document as fake.

3. The computer implemented method defined in claim 2 wherein splitting steps includes the preliminary steps of generating a canonical form of a text document; computing, from said canonical form of said text document and said secret-key, a splitting pattern that fits the number of said intervals of said text document; thereby, allowing to split and to recombine said text document on the basis of asserted and non-asserted bits of said splitting pattern.

4. The computer implemented method defined in claim 3 wherein said authentication pattern, said blurring pattern and said splitting pattern are binary vectors comprising a number of bits matching the number of said inter-word intervals.

5. The computer implemented method defined in claim 4 wherein said canonical form is obtained in stripping all blank characters, in excess of one, off said inter-word intervals.

6. The computer implemented method defined in claim 5 wherein said modifying steps include:

in the positions corresponding to the asserted bits of said blurring patterns:

adding one blank character if said inter-word intervals comprise of an odd number of said blank characters; and removing one blank character if said inter-word intervals comprise an even number of said blank characters.

7. The computer implemented method defined in claim 6 wherein modifying steps and erasing steps are performed identically.

8. The computer implemented method defined in claim 7 wherein extracting step includes removing one blank character in those of said inter-word intervals that are comprised of an even number of said blank characters;

obtaining a binary authentication vector with asserted bits corresponding to positions where said blank characters were removed.

* * * * *